May 30, 1939.  J. E. WALKER  2,160,009
PIPE COVERING
Filed July 29, 1936
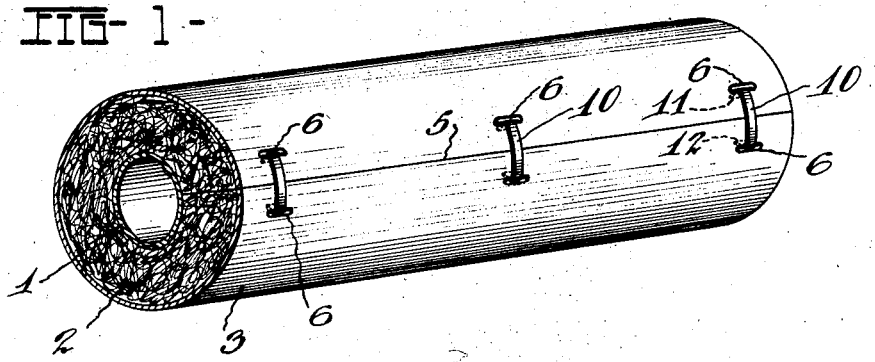
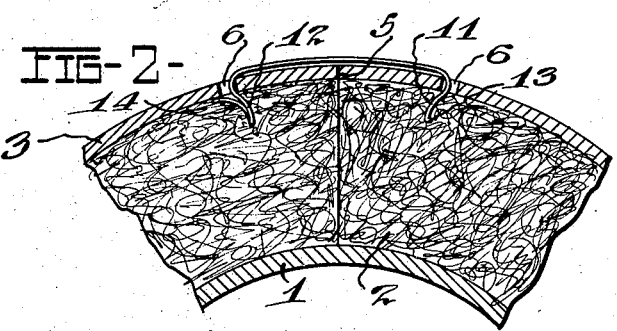
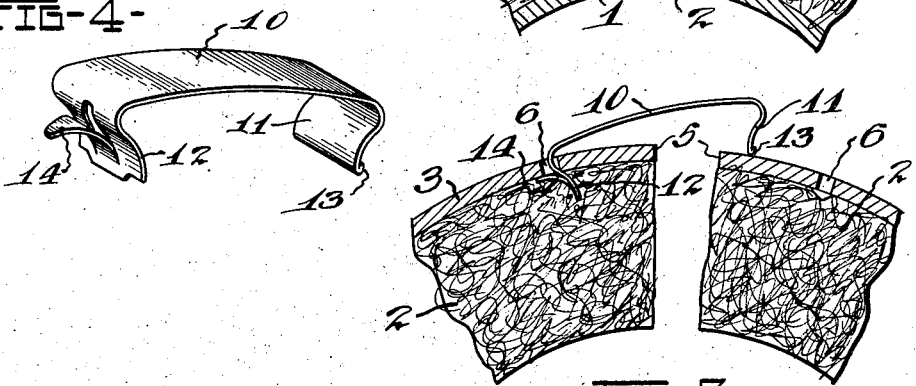
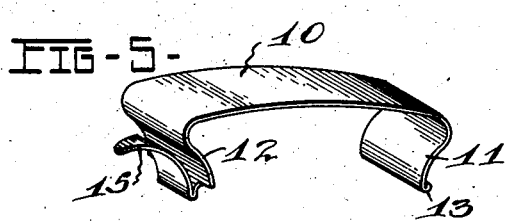
John E. Walker
INVENTOR.
BY Rule & Hoge
ATTORNEYS.

Patented May 30, 1939

2,160,009

UNITED STATES PATENT OFFICE 2,160,009

PIPE COVERING

John E. Walker, Newark, Ohio, assignor, by mesne assignments, to Owens-Corning Fiberglas Corporation, a corporation of Delaware Application July 29, 1936, Serial No. 93,205

6 Claims. (Cl. 154—44)

The present invention relates to pipe covering and, more particularly, to an improved means of affixing pipe insulation and a cover therefor to pipes and the like to be insulated.

In the use of pipe covering, it has been conventional to provide insulating material over the pipe and provide a cover therefor of canvas or the like which is held in place by means of circular bands surrounding the pipe. These latter had to be adjusted into place, were cumbersome and took a relatively long time to apply.

It is an object of the present invention to provide for pipe insulation having a cover thereover, an improved means for holding the insulation and cover in place.

It is also an object of the invention to provide a simple and inexpensive clip which may be readily snapped into place to hold the cover firmly in position without fear of its being removed or displaced or gradually loosening as the pipe becomes older or changes its size.

Another object of the invention is to provide a clip of the foregoing characteristics which may be readily unfastened or removed to permit the cover or the pipe insulation as a whole to be disassembled or adjusted.

It is also within the contemplation of the invention to provide means for affixing a pipe cover which accelerates the fabricating process in the factory which is simple and inexpensive, and which provides a neat product having a pleasing appearance.

Other objects of the invention will become apparent from the following description taken in conjunction with the drawing, in which:

Fig. 1 is a perspective view, shown partly in section, of a pipe having pipe insulation and a cover thereover which is secured and held in place by my improved clip;

Fig. 2 is a fragmentary sectional view of pipe insulation and my novel clip shown in position;

Fig. 3 is a view similar to Fig. 2, showing one end of the pipe clip in position and the other end out of position;

Fig. 4 is a perspective view of my novel clip; and

Fig. 5 is a perspective view of a modified form of my novel pipe clip.

Referring more particularly to the drawing, reference character 1 designates a conventional pipe which is insulated by a fibrous or porous material 2, such as glass wool or other suitable insulation. A method which may be used in making this pipe covering of fibrous material comprises winding a thin mat of the material around a mandrel to build up sufficient insulation, and then clapping over the fibrous material a cylindrical tube or cover 3, made of cardboard or other suitable material which is preferably stiff and capable of withstanding the usual stresses such as those caused by being walked on or having ladders leaned against the pipe insulation. The tube 3 is preferably provided with a longitudinal slit 5 extending down one side of the tube, which permits it to be opened and fitted around the insulation. The insulation 2 is then cut down one of its longitudinal sides in register with the slit 5. The pipe insulation, including the cover, may then be removed from the mandrel and mounted in place over the pipe 1.

The cover 3 is also provided with a series of slots or narrow openings 6 extending in pairs on opposite sides of the slit 5. These slots are adapted to receive my improved clips which I shall now proceed to describe.

Referring more particularly to Fig. 4 my improved clip consists of an arcuate metal band 10 which is preferably made of a spring steel or other springy substance. The radius of curvature of the band 10 is preferably shorter than the radius of curvature of the pipe cover or tube to which the clip is to be applied.

At opposite extremities of the band 10 are legs 11 and 12 respectively which may be formed by bending the ends of the band so as to stand, preferably at an acute angle to the band on the same side thereof. The end of one of the legs 11 may be bent over to form a bead 13 which enables the leg to be inserted smoothly and easily through the slot 6, particularly if the latter is formed by merely forming a slit in the cover 2. The other leg 12 may also be provided with a bead but it is desirable to provide it with a barb 14, which may be formed, as shown in Fig. 4, by punching a tongue in the leg and bending it outwardly from the band 10.

Another method of forming the clip is shown in Fig. 5, which discloses the band 10 having the legs 11 and 12 bent downwardly from the opposite ends of the band 10, and a barb 15 formed by bending the end of the leg 12 back upon itself in an outward direction to cause the extremities to project outwardly from the band 10 in a manner similar to that shown in Fig. 14.

When applying my improved clips to the pipe cover 2 an operator can merely take a handful of clips and push the clips with the legs foremost into the slots 6. As the clips are being inserted the legs are expanded by the slots, causing the band 10 to partially straighten out. After the legs have been inserted into the slots 6 the spring band tends to contract and hold the cover firmly together. The acute angles between the legs and the band, serve to maintain the clip firmly in position without a tendency to slip out or gradually work loose.

The barbs 14 or 15 generally seat themselves underneath the cover 2 to anchor one end of the clip thereunder. If it is desired to disassemble the pipe covering or open the cover it is possible to remove the opposite end of the clip either by hand or by means of a suitable instrument. It will be noted, however, that the barbed end of the clip remains embedded in one side of the cover so that the pipe insulation may be readily reassembled and held in position.

Modifications may be resorted to within the spirit and scope of the appended claims.

I claim:

1. A clip of spring metal adapted to fasten abutting longitudinal edges of a pipe cover which comprises an integral strip of metal bent to have an arcuate band and two legs at opposite ends thereof forming an acute angle with the said band, one of said legs being provided with a barb extending outwardly from said leg toward said band, and the other leg being substantially smooth and free from projections for releasably fastening said edges.

2. A clip of spring metal adapted to fasten abutting longitudinal edges of a pipe cover which comprises an integral strip of metal bent to have an arcuate band and two legs at opposite ends thereof forming an acute angle with the said band, one of said legs being formed with a barb capable of retaining said leg embedded in position, the other of said legs having a substantially flat surface for releasably fastening said clip in position.

3. Means for retaining pipe insulation in position comprising a circular tube surrounding said insulation, said tube having a slit down one side longitudinally of said tube to facilitate its assemblage on and removal from a pipe, and having slots arranged in pairs with the slots of each pair on opposite sides of said slit, and clips individual to said pairs of slots and fitting into the slots to hold said tube together, each said clip comprising a spring metal band, legs at opposite ends of said band and forming an acute angle with said band, and a barb on one of said legs adapted to anchor it into its individual slot, the other of said legs having a substantially flat surface for releasably fastening said clip in position.

4. In combination, a tubular cover for pipe insulation, said cover having a slit extending longitudinally down one side thereof to permit it to be assembled on and removed from said pipe, and a plurality of U-shaped clips having the legs thereof fitting into said cover on opposite sides of said slit to hold said cover in closed position, one of said legs being provided with means for anchoring the leg into said cover and the other leg having a substantially smooth surface for releasably fastening said clip in position.

5. A clip adapted to fasten together abutting edges of sheet cover material which comprises an integral strip of metal bent to have a band overlying said cover material, and legs at opposide ends thereof forming an acute angle with said band and penetrating into said cover material, a portion of one of said legs being bent outwardly from said leg and pointing in a direction away from the free end of said leg to form a barb adapted to anchor said leg into place, the other of said legs having a substantially flat surface and being capable of removal from said cover material without tearing or injuring said material.

6. Means for retaining pipe insulation in position comprising a tubular cover of stiff sheet material, said cover having adjoining edges extending lengthwise of the tube, said cover formed with a pair of slots on opposite sides of said adjoining edges; a sheet metal clip comprising a band extending between said slots and shaped to conform to the contour of the tube, and legs at the opposite ends of the band extending inward through said slots, one of said legs being provided with an integral barb extending away from its base toward the tube with its free end engaging the inner surface of said tube, thereby anchoring the clip and providing a hinge connection of the clip to the tube, permitting the opposite leg of the clip to be moved in or out of the corresponding slot for releasably fastening said cover in position and preventing detachment of the clip from the cover.

JOHN E. WALKER.